(12) United States Patent
Kanai et al.

(10) Patent No.: US 7,554,680 B2
(45) Date of Patent: Jun. 30, 2009

(54) PRINTER EQUIPPED WITH DISPLAY FOR DISPLAYING MENU SCREENS FOR SETTING PRINTING CONDITIONS

(75) Inventors: Yuichi Kanai, Nagano-ken (JP); Makoto Oyanagi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 891 days.

(21) Appl. No.: 10/954,337

(22) Filed: Oct. 1, 2004

(65) Prior Publication Data

US 2005/0280838 A1 Dec. 22, 2005

(30) Foreign Application Priority Data

| Oct. 1, 2003 | (JP) | ............................. 2003-343363 |
| Oct. 7, 2003 | (JP) | ............................. 2003-348540 |
| Sep. 14, 2004 | (JP) | ............................. 2004-266953 |

(51) Int. Cl.
*G06F 3/12* (2006.01)
*G06F 3/048* (2006.01)

(52) U.S. Cl. ....................... 358/1.1; 358/1.13; 715/825; 715/828

(58) Field of Classification Search ................. 715/825, 715/828; 358/1.1, 1.13
See application file for complete search history.

(56) References Cited

U.S. PATENT DOCUMENTS

| 6,308,023 | B1* | 10/2001 | Nomura et al. ............... 399/81 |
| 6,312,174 | B1* | 11/2001 | Drynkin et al. ........ 400/120.16 |
| 6,476,933 | B1* | 11/2002 | Honma ....................... 358/1.9 |
| 6,496,281 | B1* | 12/2002 | Yamamoto et al. ........... 358/401 |
| 6,618,061 | B2* | 9/2003 | Yamamoto .................... 715/817 |
| 6,898,645 | B2* | 5/2005 | Abujbara ..................... 710/17 |
| 2001/0004424 | A1* | 6/2001 | Mutoh et al. ................... 399/81 |
| 2002/0051161 | A1* | 5/2002 | Kanazawa et al. ........ 358/1.12 |
| 2003/0043208 | A1* | 3/2003 | Staelin et al. ............... 345/825 |
| 2004/0047643 | A1* | 3/2004 | Jackelen et al. ................ 399/81 |
| 2004/0061757 | A1* | 4/2004 | Yanagi et al. ............... 347/101 |

FOREIGN PATENT DOCUMENTS

| JP | 05-238075 A | 9/1993 |
| JP | 08-002020 A | 1/1996 |
| JP | 11-227265 A | 8/1999 |
| JP | 2002-264448 A | 9/2002 |
| JP | 2003-008808 A | 1/2003 |
| JP | 2003-103883 A | 4/2003 |
| JP | 2003-175657 A | 6/2003 |
| JP | 2003-241990 A | 8/2003 |
| JP | 2003-260846 A | 9/2003 |

* cited by examiner

*Primary Examiner*—Twyler L Haskins
*Assistant Examiner*—Fred Guillermety
(74) *Attorney, Agent, or Firm*—Sughrue Mion, PLLC

(57) ABSTRACT

A printer has a display for selectively displaying a plurality of menu screens for setting various printing conditions. The menu screens include a standard menu screen and a specific-purpose menu screen. The standard menu screen includes a plurality of menus selectable for setting the printing conditions. The specific-purpose menu screen is, for example, a CD-R menu screen including some of the menus of the standard menu screen, or the menus related to printing conditions of a CD-R. The printer includes an insert opening into which the CD-R, or a printing medium, is inserted and a CD-R guide selectively opening or closing the insert opening. When the CD-R guide is open, the CD-R menu screen is automatically displayed on the display.

5 Claims, 8 Drawing Sheets

Fig. 4(a) Standard Menu Screen
Fig. 4(b) CD-R Menu Screen
Fig. 4(c) Basic Menu Screen

PRINTER EQUIPPED WITH DISPLAY FOR DISPLAYING MENU SCREENS FOR SETTING PRINTING CONDITIONS

BACKGROUND OF THE INVENTION

The present invention relates to printers equipped with a display for displaying menu screens for setting various printing conditions.

Conventionally, a stand-alone printer (including multi-function printers) is known. A stand-alone printer includes a slot for receiving various types of memory cards, such as a flash memory, and obtains an image from the memory card for printing the image. Since the printer does not need a separate host computer for providing the image to the printer, the printer is relatively easy to use.

Japanese Laid-Open Patent Publication No. 2003-241990 discloses a stand-alone printer equipped with an operation panel having a display capable of displaying a menu screen for setting various printing conditions. The menu screen includes a number of menus for setting conditions such as selection of photo, the media to be printed (A4 standard paper, postcard, CD-R, and the like), printing layout, and the number of prints. By manipulating operational buttons provided in the operation panel, the user is allowed to select a requested menu from the menu screen, set printing conditions, and enable the printer to print.

The multiple menus of the menu screen are successively displayed on the display in accordance with manipulation of the operational buttons. However, other than a menu required by the user, the single menu screen includes a number of different menus. This complicates the user operation for, for example, selecting the requested menu. Also, since the menus are displayed successively in accordance with manipulation of the operation buttons, it is highly likely that the user erroneously selects a different menu than the required menu. Further, if the user needs only restricted conditions, the user operation is complicated by the multiple menus on the menu screen, which may lead to an erroneous operation.

SUMMARY OF THE INVENTION

Accordingly, it is an objective of the present invention to simplify the user operation of a printer equipped with a display for displaying menu screens.

To achieve the foregoing and other objectives and in accordance with the purpose of the present invention, the invention provides a printer printing in correspondence with setting of various printing conditions. The printer includes a display capable of selectively displaying a plurality of menu screens for setting the printing conditions and a memory for storing a standard menu screen and a specific-purpose menu screen. The standard menu screen includes a plurality of menus selectable for setting the printing conditions. The specific-purpose menu screen includes some of the menus of the standard menu screen such that some of the printing conditions set via the standard menu screen can also be set via the specific-purpose menu screen. The printer also includes a detecting device for detecting a prescribed operation with respect to the printer and a display controller for controlling the display. In accordance with a detection result obtained by the detecting device, the display controller switches the menu screen displayed on the display between the standard menu screen and the specific-purpose menu screen.

The present invention also provides a method used for a printer printing in correspondence with the setting of various printing conditions. The method includes preparing a plurality of menu screens selectively displayed on a display of the printer. The menu screens include a standard menu screen and a specific-purpose menu screen. The standard menu screen includes a plurality of menus selectable for setting the printing conditions. The specific-purpose menu screen includes some of the menus of the standard menu screen such that some of the printing conditions set via the standard menu screen can also be set via the specific-purpose menu screen. The method further includes switching the menu screen displayed on the display between the standard menu screen and the specific-purpose menu screen based on detection of a prescribed operation performed with respect to the printer.

The present invention further provides a printer printing in correspondence with the setting of various printing conditions. The printer includes a display capable of selectively displaying a plurality of menu screens for setting the printing conditions and a display controller for controlling the display. The menu screens include a standard menu screen and a specific-purpose menu screen. The standard menu screen includes a plurality of menus selectable for setting the printing conditions. The specific-purpose menu screen includes some of the menus of the standard menu screen such that some of the printing conditions set via the standard menu screen can also be set via the specific-purpose menu screen. The display controller has a standard mode for operating the display to display the standard menu screen and a specific-purpose mode for operating the display to display the specific-purpose menu screen. The display controller is switched between the standard mode and the specific-purpose mode. The printer also includes a first memory for storing the printing conditions set in the standard mode and a second memory for storing the printing conditions set in the specific-purpose mode. When switching the modes, the display controller reads out the printing conditions of a previous mode before switching of the modes from a corresponding one of the memories and operates the memory corresponding to a current mode after switching of the modes to store the conditions, such that the stored conditions are reflected in the current mode.

The present invention further provides a method used for a printer printing in correspondence with setting of various printing conditions. The method includes preparing a plurality of menu screens selectively displayed on a display of the printer. The menu screens include a standard menu screen and a specific-purpose menu screen. The standard menu screen includes a plurality of menus selectable for setting the printing conditions. The specific-purpose menu screen includes some of the menus of the standard menu screen such that some of the printing conditions set via the standard menu screen can also be set via the specific-purpose menu screen. The method also includes selectively executing a standard mode for operating the display to display the standard menu screen and a specific-purpose mode for operating the display to display the specific-purpose menu screen. The method also includes storing the printing conditions set in the standard mode, storing the printing conditions set in the specific-purpose mode, and reflecting the printing conditions set in a previous mode before switching of the modes in a current mode after switching of the modes, when the modes are switched.

BRIEF DESCRIPTION OF THE DRAWINGS

The characteristics of the present invention that are believed to be novel will be made clear in the attached claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment of the present invention will hereafter be described in detail with reference to the attached drawings.

Figure 1:
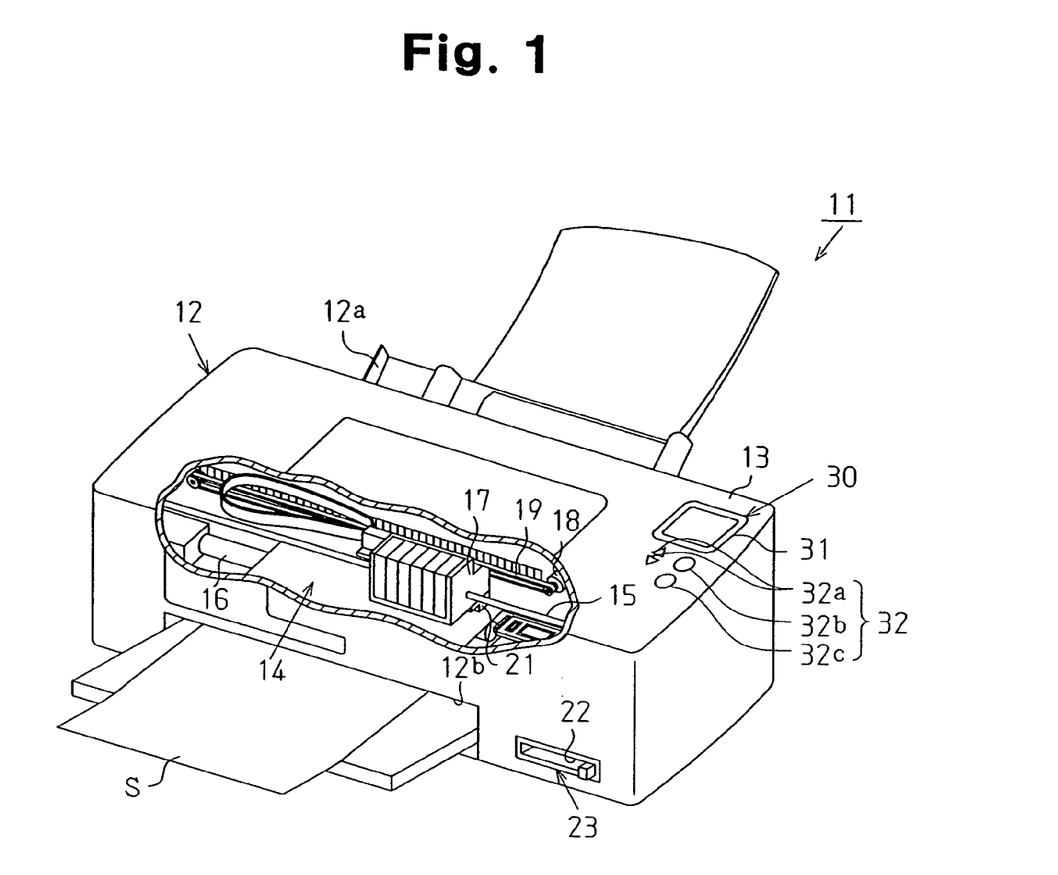
FIG. 1 is a perspective view, with a part cut away, showing a printer of a first embodiment of the present invention.

As shown in FIG. 1, a printer 11 includes a printer body 12 and a paper feeder 12a attached to the rear side of the body 12. A plurality of paper sheets S, each of which corresponds to a printing medium, are set in the paper feeder 12a. The paper feeder 12a successively feeds the sheets S to the printer body 12.

The printer body 12 has a casing 13 and a printing mechanism 14 accommodated in the casing 13. The printing mechanism 14 subjects a sheet S sent by a non-illustrated paper sender to printing. More specifically, the printing mechanism 14 includes a carriage 17 supported by a rail 15 to be reciprocated along the axis of a platen 16. The carriage 17 is connected to a timing belt 19 revolved by a carriage motor 18. When the carriage motor 18 is actuated, the carriage 17 is moved along the rail 15. A printing head 21 is disposed at a lower side of the carriage 17 opposed to the sheet S for injecting ink onto the sheet S. The ink is thus deposited on the sheet S such that printing is performed on the sheet S. The printed sheet S is discharged from an outlet 12b, which opens at a lower front portion of the printer body 12. The movement direction of the carriage 17 is referred to as the main scanning direction and the sending direction of the sheets S is referred to as the sub scanning direction.

A reading device 23 is provided in the printer body 12 and includes a slot 22 into which a memory card (not shown) is inserted. The slot 22 has an opening in a front side of the printer body 12 and at a side of the outlet 12b. The memory card stores an image acquired by, for example, a digital camera. Since the printer 11 of the first embodiment is a standalone type, the printer 11 does not need to be connected to a separate host computer. The printer 11 simply obtains an image from the memory card in the slot 22 and prints the image.

Figure 2:
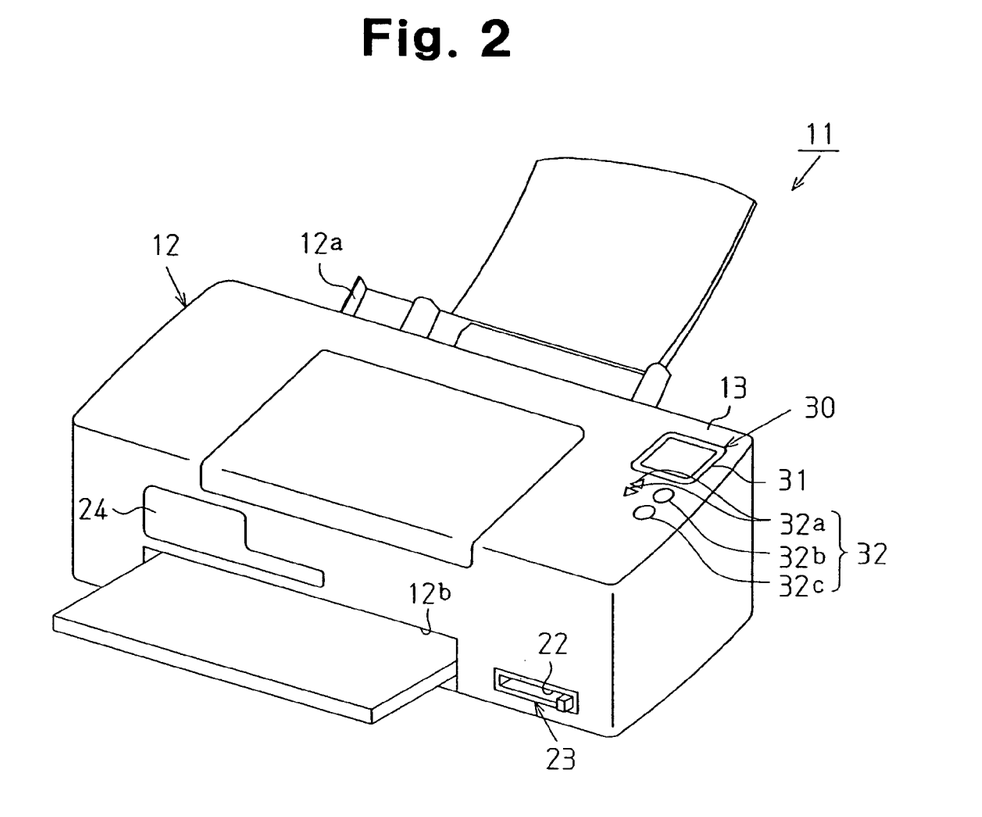
FIG. 2 is a perspective view showing the printer of FIG. 1 with a CD-R tray held in a closed state.
Figure 3:
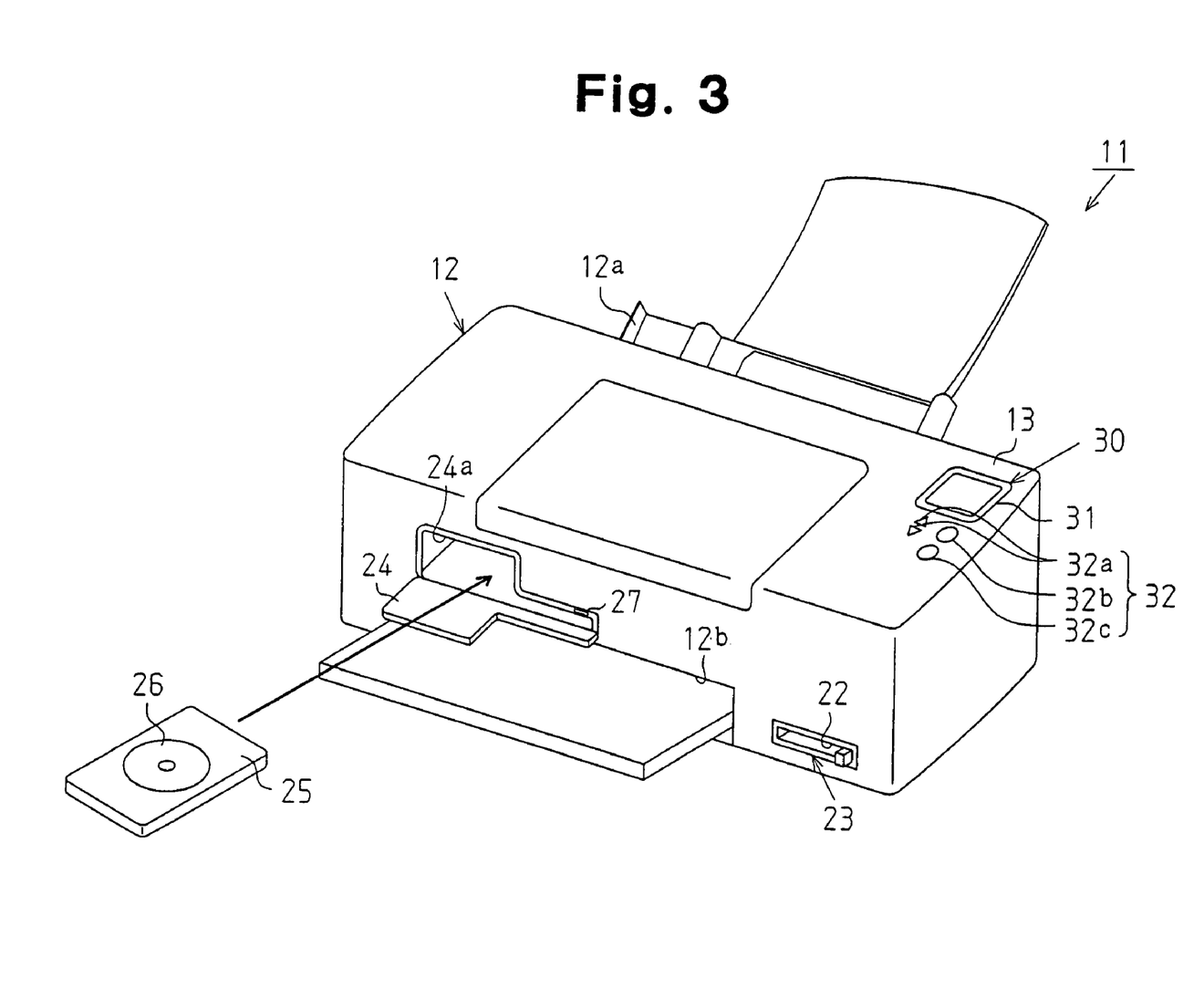
FIG. 3 is a perspective view showing the printer of FIG. 1 with the CD-R tray held in an open state.

With reference to FIGS. 2 and 3, an insert opening 24a is defined in the front side of the printer body 12 at a position above the outlet 12b. Through the insert opening 24a, a tray 25 carrying a CD-R 26, or a predetermined type of medium, is inserted into the printer body 12a. A CD-R guide 24 is a cover attached to the printer body 12 such that the insert opening 24a is selectively opened or closed by the CD-R guide 24. When the CD-R guide 24 is held at an open position for opening the insert opening 24a, referring to FIG. 3, the tray 25 carrying the CD-R 26 is inserted into the printer body 12a through the insert opening 24a. The CD-R 26, which is the printing media, is thus subjected to printing. During insertion of the tray 25 and printing, the CD-R guide 24 supports the tray 25 from below and guides the tray 25.

The printing mechanism is adjusted automatically to a suitable state for printing on the printing surface of the CD-R 26. More specifically, as the CD-R guide 24 is switched to the open position, the positions of the platen 16 and the carriage 17 are automatically adjusted to be suitable for the CD-R 26, which is placed on the tray 25 to be inserted.

A sensor 27 is arranged at an upper end of the section defining the insert opening 24a for sensing whether or not the CD-R guide 24 is open. When the CD-R guide 24 is held at a closed position, the sensor 27 is pressed by the CD-R guide 24. The sensor 27 functions as a detecting device for detecting a prescribed type of operation performed with respect to the printer 11 and generates a signal depending on whether or not the CD-R guide 24 is open.

An operation panel 30 is provided at a right portion of an upper side of the printer body 12 and includes a display 31 and an operating portion 32. Different types of menu screens for setting various printing conditions are selectively displayed on the display 31. Each of the menu screens includes a plurality of menus. The operating portion 32 includes cursor buttons 32a, an enter button 32b, and a switch button 32c. By manipulating the cursor buttons 32a, a certain menu is selected from a menu screen displayed on the display 31. For entering the selected menu, the enter button 32b is depressed. Further, by depressing the switch button 32c, the menu screen displayed on the display 31 is switched to a different menu screen. In other words, manipulation of the buttons 32a to 32c allows the user to set a requested printing condition.

Figure 4A:
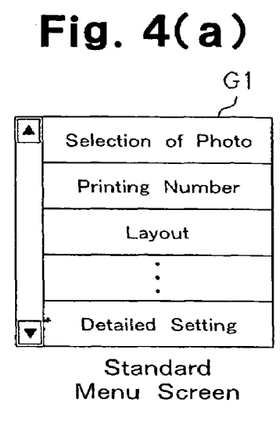
FIG. 4(a) is a view showing a standard menu screen displayed on a display of the printer of FIG. 1.
Figure 4B:
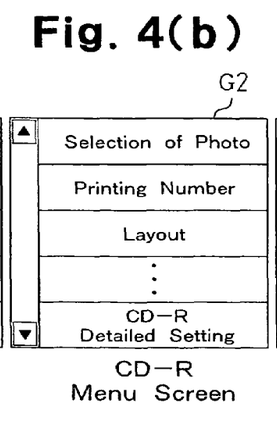
FIG. 4(b) is a view showing a CD-R menu screen displayed on the display of the printer of FIG. 1.
Figure 4C:
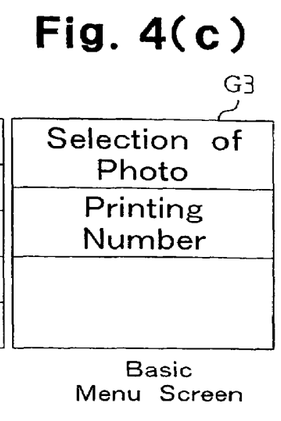
FIG. 4(c) is a view showing a basic menu screen displayed on the display of the printer of FIG. 1.

The display 31 is capable of displaying three types of menu screens including the standard menu screen G1 of FIG. 4(a), the CD-R menu screen G2 of FIG. 4(b), and the basic menu screen G3 of FIG. 4(c). The CD-R menu screen G2 and the basic menu screen G3 each function as a specific-purpose menu screen.

As illustrated in FIG. 4(a), the standard menu screen G1 indicates a plurality of menus including "selection of photo", "printing number", "layout", and "detailed setting". The menu "selection of photo" is used for selecting a photo (an image) to be printed. Using the menu "printing number", the number of prints is selected. The printing layout for the media to be printed is set by means of the menu "layout". The menu "detailed setting" is related mainly to setting of the image to be printed. If this menu is selected, detailed menus such as image quality and brightness are displayed.

Referring to FIG. 4(b), the CD-R menu screen G2 includes some of the menus displayed on the standard menu screen G1, or, more specifically, menus related to printing conditions of a CD-R. In the first embodiment, the CD-R menu screen G2 indicates a plurality of menus including "selection of photo", "printing number", "layout", and "CD-R detailed setting". The menu "CD-R detailed setting" is essentially the same as the menu "detailed setting" of the standard menu screen G1. However, in terms of the CD-R menu screen G2, the printing conditions of the image to be printed such as the image quality and brightness are normally set to predetermined conditions at an initial stage. For example, the image quality is set to a maximum value and the brightness is set to a standard value.

With reference to FIG. 4(c), the basic menu screen G3 includes some of the menus displayed on the standard menu screen G1, or, more specifically, two of the menus, or "selection of photo" and "printing number". However, in the basic menu screen G3, each of the characters indicating the menus are displayed in an enlarged size, as compared to the standard menu screen G1 and the CD-R menu screen G2. Further, in the basic menu screen G3, the printing conditions of the image to be printed are set to predetermined conditions initially, like the CD-R menu screen G2.

If the switch button 32c is depressed by the user, the menu screen displayed on the display 31 is switched in a circulating manner from, for example, the standard menu screen G1 to the CD-R menu screen G2, and then to the standard menu screen G1.

The electric configuration of the printer 11 is as follows.

Figure 5:
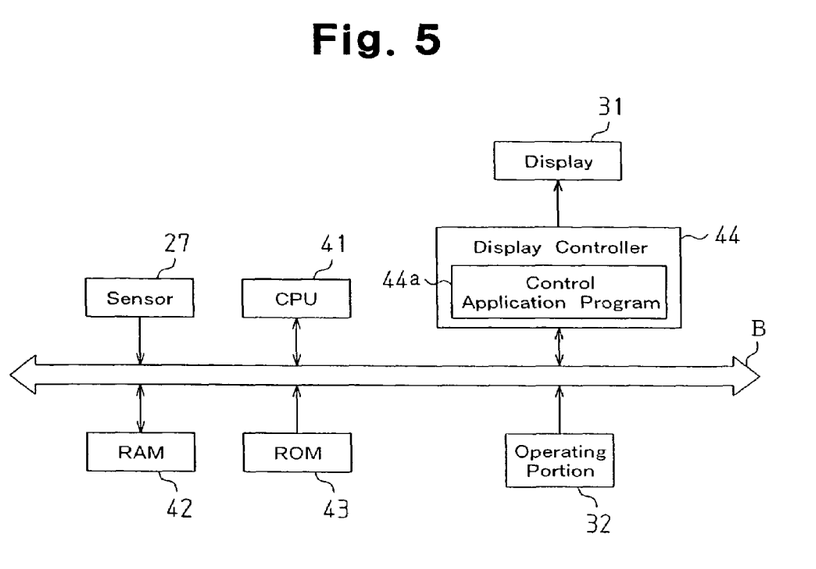
FIG. 5 is a block diagram showing the electric configuration of the printer of FIG. 1.

With reference to FIG. 5, the sensor 27, a CPU 41, a RAM 42, a ROM 43, and the operating portion 32, and a display controller 44 for controlling the display 31 are interconnected through a bus B. The CPU 41 controls operation of the printer 11 as a whole, using the RAM 42 as a memory area, in accordance with various programs stored in the ROM 43. Data regarding three types of menu screens including the standard menu screen G1, the CD-R menu screen G2, and the basic menu screen G3 is pre-stored in the ROM 43.

In response to a prescribed operation performed with respect to the printer 11, or, more specifically, if the CD-R guide 24 is moved to an open position, the sensor 27 outputs an ON signal to the CPU 41 through the bus B. In contrast, if the CD-R guide 24 is moved to a closed position, the sensor 27 outputs an OFF signal to the CPU 41 through the bus B.

In response to the ON signal from the sensor 27, the CPU 41 sends an OPEN signal to the display controller 44 through the bus B. In contrast, in the case of the OFF signal, the CPU 41 sends a CLOSE signal to the display controller 44 through the bus B.

Controlling of the display 31 by the display controller 44 is based mainly on a control application program 44a, which is incorporated in the display controller 44. More specifically, the control application program 44a includes three modes including a standard mode, a CD-R mode, and a basic mode respectively corresponding to the three menu screens G1, G2, and G3. By switching the modes of the control application program 44a, the display controller 44 reads out a requested one of the standard menu screen G1, the CD-R menu screen G2, and the basic menu screen G3 and operates the display 31 to display the menu screen. Further, when switching the menu screens, the display controller 44 operates the display 31 to indicate that the current menu screen is to be switched to a different menu screen, continuously for a predetermined time (for example, one second) and by means of, for example, a pop-up window.

The operation of the printer 11 will hereafter be described with reference to FIG. 6. As aforementioned, the control application program 44a is a software program incorporated in the display controller 44. However, in FIG. 6, the operation executed by the display controller 44 in accordance with switching of the modes of the control application program 44a will be treated as the operation of the control application program 44a, unlike other different operations executed by the display controller 44.

Figure 6:
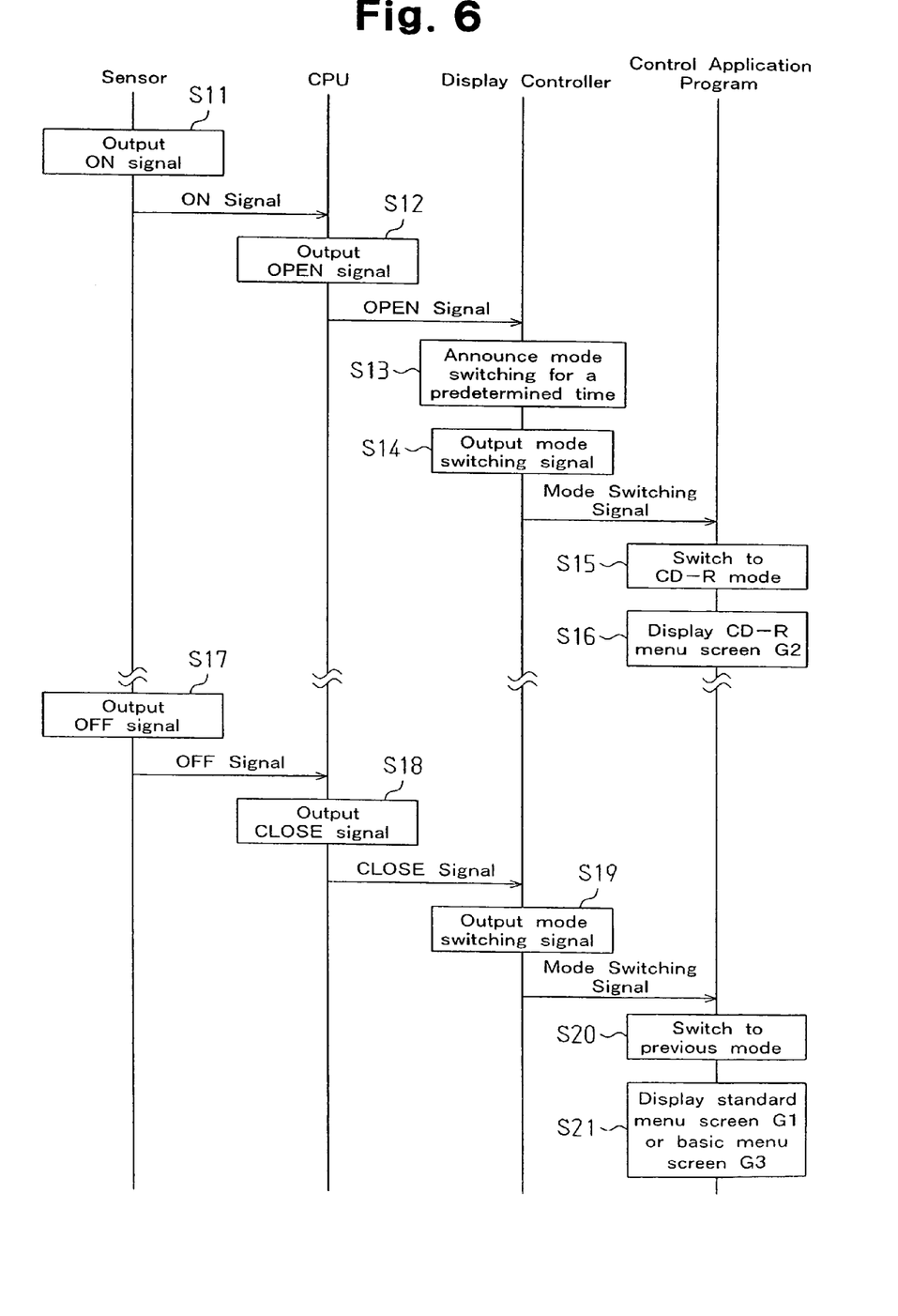
FIG. 6 is a sequence chart illustrating a display control procedure of the first embodiment.

When the user opens the CD-R guide 24, the sensor 27 sends an ON signal to the CPU 41 through the bus B, in step S11 of FIG. 6. In accordance with the ON signal, the CPU 41 determines in step S12 that the CD-R guide is open, thus sending an OPEN signal to the display controller 44 through the bus B. Meanwhile, the user places the CD-R 26 on the tray 25 and inserts the tray 25 into the printer body 12 through the insert opening 24a, with the CD-R guide 24 held in the open state.

In response to the OPEN signal from the CPU 41, the display controller 44 operates the display 31 to indicate an announcement that the menu screen currently displayed on the display 31 is to be switched to the CD-R menu screen G2, continuously for a predetermined time (for example, one second), in step S13. In the subsequent step S14, the display controller 44 outputs a mode switching signal to the control application program 44a. As a result, in step S15, the control application program 44a switches from the current mode to the CD-R mode. Subsequently, in step S16, the control application program 44a reads out the data regarding the CD-R menu screen G2 from the ROM 43 and operates the display 31 to display the CD-R menu screen G2. In this manner, the menu screen displayed on the display 31 is changed to the CD-R menu screen G2. The user is thus allowed to select a menu from the CD-R menu screen G2 and set a printing condition. In accordance with the printing condition, the CPU 41 controls the printing mechanism 14 to subject the CD-R 26 to printing.

When printing is completed, the user ejects the tray 25 from the insert opening 24a with the CD-R 26 mounted on the tray 25 and closes the CD-R guide 24. This enables the sensor 27, in step S17, to send an OFF signal to the CPU 41 through the bus B. In response to the OFF signal, the CPU 41 determines that the CD-R guide is closed, in step S18, and outputs a CLOSE signal through the bus B.

When receiving the CLOSE signal from the CPU 41, the display controller 44 sends a mode switching signal to the control application program 44a in step S19. In the subsequent step S20, the control application program 44a returns from the current CD-R mode to the previous mode. In other words, if the CD-R mode has been switched from the standard mode for displaying the standard menu screen G1, the control application program 44a switches to the standard mode in step S20 and operates the display 31 to display the standard menu screen G1 in step S21. In contrast, if the CD-R mode has been switched from the basic mode, the control application program 44a switches to the basic mode in step S20 and operates the display 31 to display the basic menu screen G1 in step S21.

Further, if the CD-R guide 24 is opened when printing is conducted, the display controller 44 operates the display 31 to display an error screen. The currently displayed menu screen is thus not switched to the CD-R menu screen G2. In this case, the CD-R menu screen G2 is displayed when the user reopens the CD-R guide 24 after printing is completed.

The first embodiment has the following advantages.

(1) In addition to the standard menu screen G1, the menu screens displayed on the display 31 includes the CD-R menu screen G1, which indicates some of the menus included in the standard menu screen G1 related to printing conditions of a CD-R. This simplifies the user operation of the printer 11 and suppresses operational errors, as compared to the case in which the printing conditions of the CD-R are set using the standard menu screen G1 including multiple menus.

(2) The menu screens of the display 31 also include the basic menu screen G3. The basic menu screen G3 includes fewer menus than the standard menu screen G1 and is displayed with larger characters than the standard menu screen G1. If the printing conditions needed by the user are limited, the user may select the basic menu screen G3. In this case, the user only has to set printing conditions regarding two menus, "selection of photo" and "printing number". The user operation of the printer 11 is thus relatively simple, and erroneous operation is suppressed. Also, since the characters indicating the menus are relatively large, the menus are easy to view and thus facilitate the user operation.

(3) The sensor 27 is configured to detect the user operation for inserting the CD-R 26 into the printer 11, or opening and closing of the CD-R guide 24. When the sensor 27 detects that the CD-R guide 24 is opened, the menu screen displayed on the display 31 is switched to the CD-R menu screen G2. In other words, before subjecting the CD-R 26 to printing, the user must necessarily open the CD-R guide 24. When the CD-R guide 24 is opened, the menu screen is automatically switched to the CD-R menu screen G2. Accordingly, without requiring a particular operation such as depressing the switch button 32c, the menu screen is easily switched to the CD-R menu screen G2.

(4) Before the menu screen displayed on the display 31 is switched to the CD-R menu screen G2, the display 31 indicates an announcement that the menu screen is to be switched, continuously for a predetermined time. The user is thus informed of switching of the menu screens.

The first embodiment may be modified as follows.

Other than the CD-R menu screen G2 of FIG. 4(a) and the basic menu screen G3 of FIG. 4(c) indicated as the specific-purpose menu screen, different types of menu screens may be provided as the specific-purpose menu screens. For example, the specific-purpose menu screens may include a menu screen for setting a printing condition for printing a photo by photo size (for example, size L, or 89×127).

Further, as a specific-purpose menu screen, a series of layered menu screens may be provided. The layered menu screens include the printing method menu screen G4 of FIG. 7(a), the printing media menu screen G5 of FIG. 7(b), and the CD-R menu screen G2 of FIG. 4(b) or 7(c). The printing method menu screen G4 includes a plurality of menus related to printing methods. The printing media menu screen G5 allows the printing media to be selected. In accordance with manipulation of the operating portion 32, the display controller 44 displays a lower-layer menu screen, or the CD-R menu screen G2, after displaying an upper-layer menu screen, or the printing method menu screen G4, and an intermediate-layer menu screen, or the printing media menu screen G5.

Figure 7A:
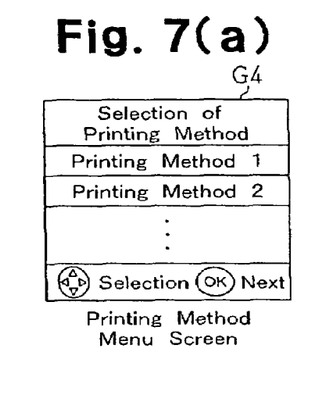
FIGS. 7(a) to 7(c) are views showing other examples of specific-purpose menu screens displayed on the display, in which FIG. 7(a) corresponds to a printing method menu screen, FIG. 7(b) corresponds to a printing media menu screen, and FIG. 7(c) corresponds to a CD-R menu screen.
Figure 7B:
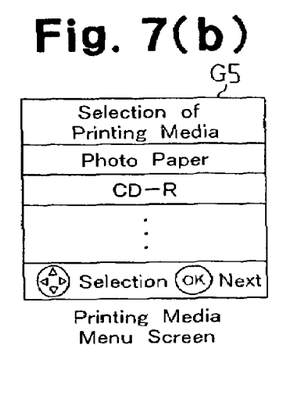
Figure 7C:
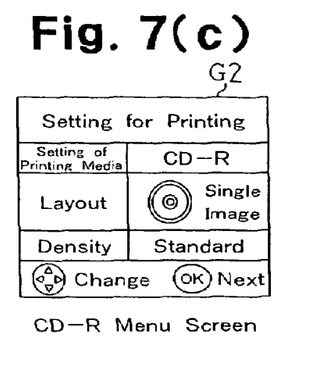

In the CD-R menu screen G2 of FIG. 7(c), a standard "single image layout" is pre-selected as the menu "layout". Instead of the CD-R menu screen G2 of FIG. 4(b), the CD-R menu screen G2 of FIG. 7(c) may be displayed as an initial menu screen. In accordance with the "single image layout", a single photo (or image) is printed on the CD-R 26. However, regarding the menu "layout", it is possible to select a pattern for printing a plurality of, four or twelve, for example, photos (or images) on the CD-R 26 as arranged on the CD-R 26.

When it is determined by the sensor 27 that the CD-R guide 24 is open, the CD-R menu screen G2 of FIG. 4(b) or FIG. 7(c) may be immediately displayed, without displaying the printing method menu screen G4 of FIG. 7(a) or the printing media menu screen G5 of FIG. 7(b). In this case, display of the CD-R menu screen G2 occurs immediately after the user operation necessary for subjecting the CD-R 26 to printing. In other words, it is unnecessary to conduct a particular operation for displaying the CD-R menu screen G2. This allows the user to quickly start printing on the CD-R 26.

Figure 8:
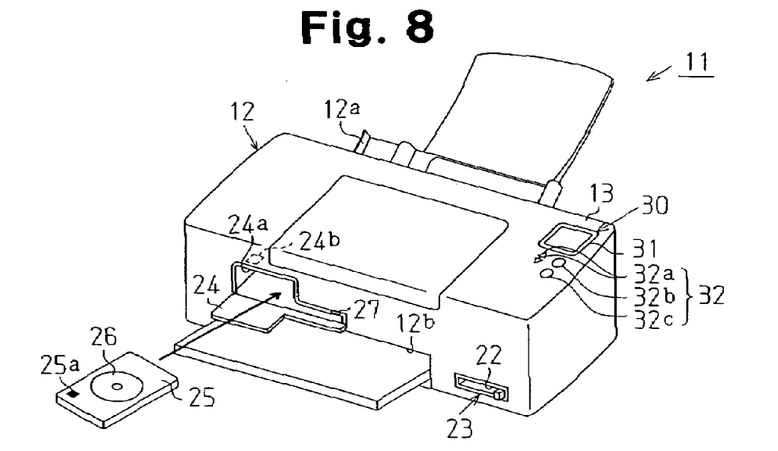
FIG. 8 is a perspective view showing a modification of the printer of FIG. 1.

In the embodiment illustrated in FIGS. 1 to 6, the menu screen is switched to the CD-R menu screen G2 when the CD-R guide 24 is opened. However, the operation causing the menu screen to be switched to the CD-R menu screen G2 does not necessarily have to be restricted to opening of the CD-R guide 24. For example, the menu screen may be switched to the CD-R menu screen G2 when the tray 25 is inserted into the insert opening 24a. That is, as illustrated in FIG. 8, a reflecting portion 25a is formed on an upper surface of the tray 25 and a photo sensor 24b is provided in the space defined by the insert opening 24a. When the tray 25 is inserted into the printer body 12 and reaches a predetermined position, the reflecting portion 25a is opposed to the photo sensor 24b, allowing the photo sensor 24b to generate a detection signal. In response to the detection signal, the display controller 44 switches the menu screens displayed on the display 31. The photo sensor 24b and the reflecting portion 25a each function as a detecting device for detecting a prescribed operation conducted with respect to the printer 11. Alternatively, switching of the menu screens may be performed when a memory card is inserted into the slot 22. In this case, it is preferred to provide a detecting device for detecting insertion of the memory card into the slot 22.

Figure 9:
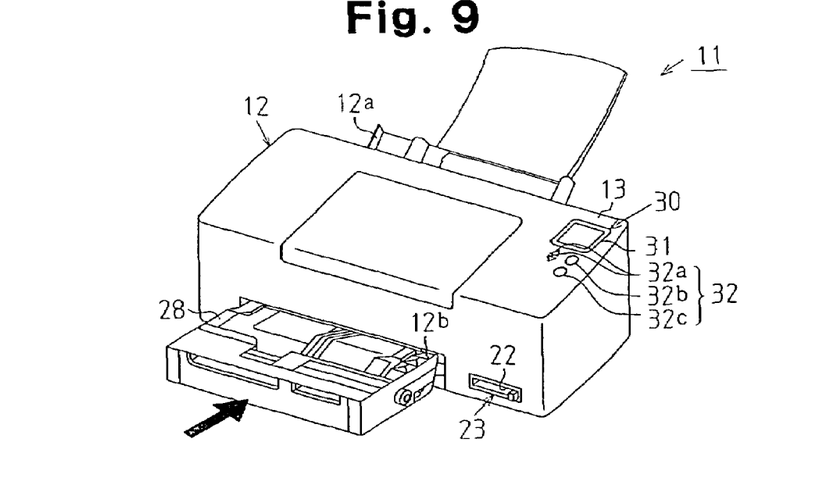
FIG. 9 is a perspective view showing another modification of the printer of FIG. 1.

The CD-R guide 24 of FIG. 3 may be omitted. If this is the case, it is preferred to provide, for example, a guide member 28 attachable and detachable with respect to the outlet 12b, as shown in FIG. 9. Before subjecting the CD-R 26 to printing, the guide member 28 is attached to a wall of the outlet 12b. The CD-R 26 is then placed on the tray 25, and the tray 25 is inserted into the printer body 12 as guided by the guide member 28. Also, it is preferred to provide a detecting device (a sensor or switch) for detecting setting of the guide member 28 in the printer body 12 such that the guide member 28 is capable of guiding the tray 25 carrying the CD-R 26. When the detecting device detects that the guide member 28 is set in the printer body 12, the display controller 44 operates the display 31 to display the CD-R menu screen G2.

The sensor 27 of FIG. 3 may be omitted. Further, in FIG. 8, the photo sensor 24b and the reflecting portion 25a for detecting insertion of the tray 25 may be omitted. Also, in FIG. 9, the detecting device for detecting setting of the guide member 28 in the printer body 12 may be omitted. In these cases, the menu screens are switched in accordance with manipulation of the switch button 32c.

A currently selected mode of the control application program 44a, or data regarding a currently displayed menu screen, may be stored, such that, when the printer 11 is turned on, the display 31 displays the menu screen corresponding to the previous mode. In this case, the user who often uses a single, particular menu screen does not have to switch the menu screens. The user operation is thus simplified.

A second embodiment of the present invention will now be described with reference to FIGS. 10 and 11. The description focuses on the difference between the first embodiment of FIGS. 1 to 6 and the second embodiment.

Figure 10:
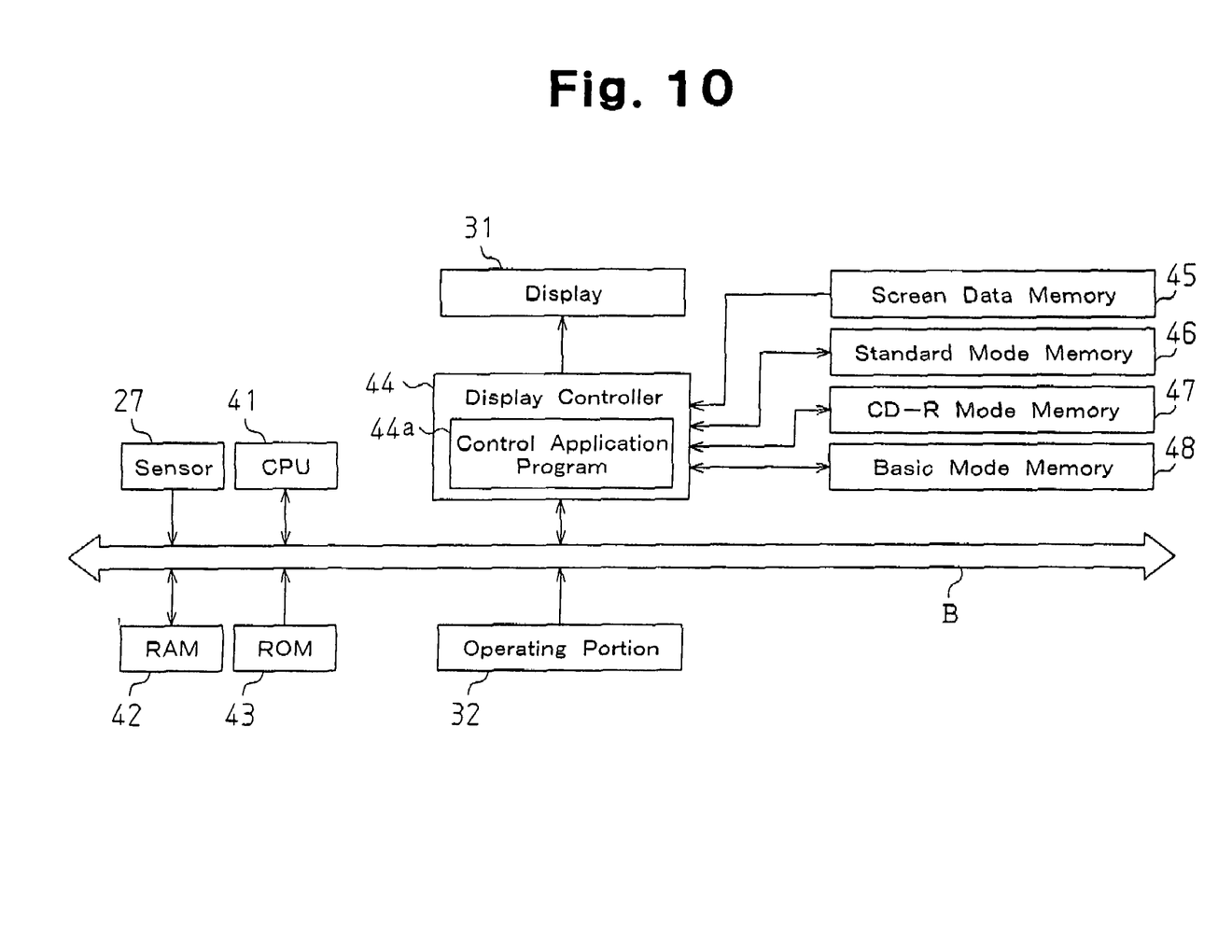
FIG. 10 is a block diagram illustrating the electronic configuration of a printer according to a second embodiment of the present invention.

Referring to FIG. 10, the second embodiment includes a screen data memory 45, which is connected to the display controller 44. The screen data memory 45 pre-stores data regarding the three menu screens G1, G2, G3 of FIGS. 4(a) to 4(c). Further, a standard mode memory 46, a CD-R mode memory 47, and a basic mode memory 48 are connected to the display controller 44. The screen data memory 45 is formed by, for example, a ROM. In contrast, each of the standard mode memory 46, the CD-R mode memory 47, and the basic mode memory 48 is configured by, for example, a RAM. The standard mode memory 46 functions as a first memory and the CD-R mode memory 47 and the basic mode memory 48 each function as a second memory.

Like the first embodiment, the control application program 44a incorporated in the display controller 44 includes a standard mode, a CD-R mode, and a basic mode respectively corresponding to the three menu screens G1, G2, and G3. By switching the modes of the control application program 44a, the display controller 44 reads out a requested one of the standard menu screen G1, the CD-R menu screen G2, and the basic menu screen G3 from the screen data memory 45 and operates the display 31 to display the requested menu screen.

Further, the display controller 44 operates each of the standard mode memory 46, the CD-R mode memory 47, and the basic mode memory 48 to store printing conditions set in the corresponding one of the modes. More specifically, the display controller 44 operates the standard mode memory 46, the CD-R mode memory 47, and the basic mode memory 48 to store printing conditions set in the standard mode, the CD-R mode, and the basic mode, respectively. Further, when switching the modes, the display controller 44 reads out the printing conditions of the previous mode immediately before switching to the current mode, from a corresponding one of the memories 46, 47, 48. The printing conditions read out by the display controller 44 are stored in and reflected by one of the memories 46, 47, 48 corresponding to a current mode to which the previous mode has been switched.

The operation of the printer 11 will now be explained with reference to FIG. 11.

If the standard menu screen G1 is displayed on the display 31 such that the user selects a menu on the standard menu screen G1 and sets various printing conditions, in which a single photo is selected for printing by means of the menu "selection of photo" and the printing number is set by means of the menu "printing number", the control application program 44a operates the standard mode memory 46 to store data related to the photo to be printed and the printing number, or the set printing conditions, in step S111.

When the CD-R guide 24 is opened by the user, the procedure corresponding to steps S11 to S15 or FIG. 6 is performed in the subsequent steps S112 to S116. In step S116, the control application program 44a is switched from the standard mode, which is the current mode, to the CD-R mode.

Subsequently, in step S117, the control application program 44a reads out the printing conditions stored in the standard mode memory 46, or the data related to the photo to be printed and the printing number. The data is written in and reflected by the CD-R mode memory 47. In step S118, the control application program 44a reads out the printing conditions reflecting the printing conditions of the standard mode from the CD-R mode memory 47. Further, the control application program 44a reads out the data corresponding to the CD-R menu screen G2 from the screen data memory 45, thus operating the display 31 to display the CD-R menu screen G2.

In this manner, the printing conditions set in the standard mode are reflected in the CD-R mode. If printing is started in this state, the CPU 41 subjects the CD-R 26 to printing under the same printing conditions as those of the standard mode. In other words, the photo selected in the standard mode is printed on the CD-R(s) 26 in the number selected in the standard mode.

When printing is completed, the user ejects the tray 25 carrying the CD-R 26 from the insert opening 24a and closes the CD-R guide 24. Subsequently, the procedure corresponding to steps S17 to S20 of FIG. 6 is performed in steps S121 to S124. Since the previous mode immediately before the current CD-R mode is the standard mode in the second embodiment, the current mode is switched to the CD-R mode in step S124. In step S125, the control application program 44a operates the standard mode memory 46 to store the printing conditions of the CD-R mode. Next, the control application program 44a operates the display 31 to display the standard menu screen G1 in step S126.

Figure 11:
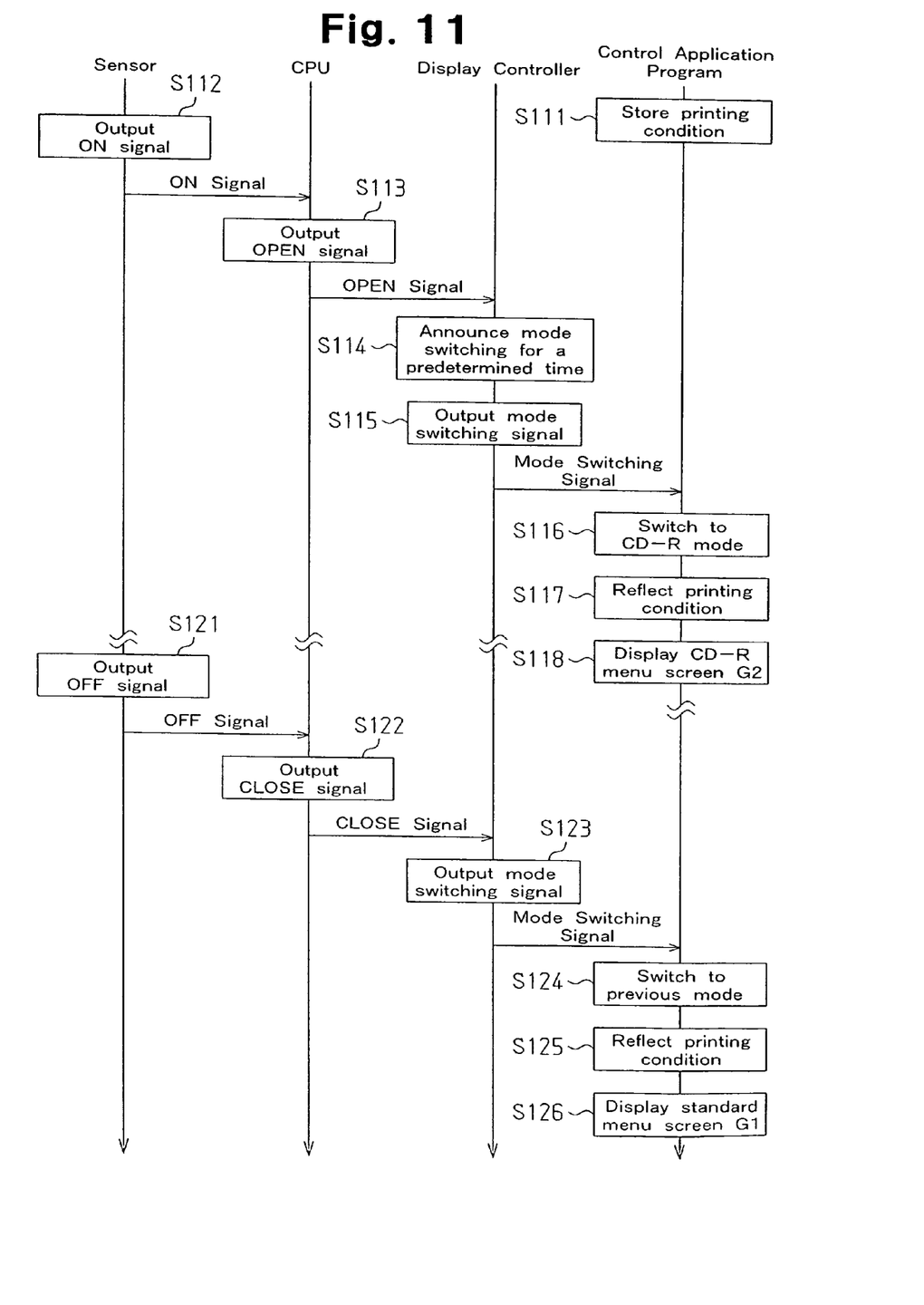
FIG. 11 is a sequence chart indicating a display control procedure of the printer of FIG. 10.

Switching between the standard mode and the CD-R mode has been explained so far, with reference to FIG. 11. Switching is conducted between the standard mode and the basic mode or the CD-R mode and the basic mode in the same manner as indicated in FIG. 11. For example, if the standard mode is switched to the basic mode, the printing conditions stored in the standard mode memory 46 are read out and written in the basic mode memory 48. The printing conditions reflecting the printing conditions of the standard mode are thus read out from the basic mode memory 48. Meanwhile, the data corresponding to the basic menu screen G3 is read out from the screen data memory 45. The display 31 is thus operated to display the basic menu screen G3.

As has been described, in the second embodiment, the printing conditions of the previous mode immediately before the current mode are reflected in the current mode. Accordingly, as long as it is unnecessary to change the printing conditions between the previous mode and the current mode, complicated resetting of the printing conditions is not required after switching of the modes. This simplifies the user operation.

In the second embodiment, the printing conditions set in the previous mode immediately before switching of the modes are reflected in the printing conditions for the current mode to which the previous mode has been switched. However, the printing conditions of the current mode may reflect the printing conditions of any of the other previous modes than the one immediately before switching of the modes. In this case, each of the standard mode memory 46, the CD-R mode memory 47, and the basic mode memory 48 must be capable of storing multiple sets of printing conditions. The printing conditions to be reflected in the current mode are thus selected from the sets of printing conditions that have been set previously, by means of a selecting device such as a switch and a button.

Also, the user may be allowed to determine whether or not the previous printing conditions should be reflected in the current mode, by means of a setting device such as a switch or a button.

Each of the memories 46, 47, 48 may be formed by a rewritable nonvolatile memory such as a flash memory and an EEPROM, other than the RAM. In this case, even after the printer 11 is turned off, the memories 46, 47, 48 retain the printing conditions stored immediately before deactivation of the printer 11. Thus, when the printer 11 is turned on, the printer 11 is activated in accordance with the mode corresponding to the retained printing conditions, such that printing is conducted under these printing conditions.

Although the structures of FIGS. 7(*a*) to 9 are illustrated as modification of the first embodiment, the structures may be applied to the second embodiment.

In each of the illustrated embodiments, when printing on the CD-R 26 is completed and the CD-R guide 24 is closed, the CD-R mode is switched to the previous mode. However, the CD-R mode may be switched to the standard mode at any time, regardless of from what mode the CD-R mode has been switched.

In each of the illustrated embodiments, a different type of disk medium (recording medium) such as DVD-R may be selected as a printing medium, other than the CD-R. Particularly, since the DVD-R is shaped and sized identical to a CD-R, a DVD-R may be subjected to printing in the same manner as has been explained for the illustrated embodiments.

The present examples and embodiments are to be considered as illustrative and not restrictive and the invention is not to be limited to the details given herein, but may be modified within the scope and equivalence of the appended claims.

The invention claimed is:

1. A printer printing in correspondence with setting of various printing conditions, wherein the printer is adapted to subject a disk medium to printing, the printer comprising:
    a display adapted to selectively display a plurality of menu screens for setting the printing conditions;
    a memory for storing a standard menu screen and a specific-purpose menu screen as the menu screens, the standard menu screen including a plurality of menus selectable for setting the printing conditions, the specific-purpose menu screen including some of the menus of the standard menu screen such that some of the printing conditions set via the standard menu screen can also be set via the specific-purpose menu screen, and the specific-purpose menu screen including a menu screen for the disk medium including the menus of the standard menu screen related to printing conditions of the disk medium;
    a detecting device for detecting a particular operation performed with respect to the printer necessarily for subjecting the disk medium to printing; and
    a display controller for controlling the display, wherein, based on detection of the particular operation by the detecting device, the display controller operates the display to display the menu screen for the disk medium;
    a cover or guide, the cover being adapted to selectively open or close an insert opening into which the disk medium is inserted, the guide being set in the printer for guiding insertion of the disk medium into the printer, the detecting device detecting, as the particular operation, an open state of the cover or setting of the guide in the printer such that the guide can guide the disk medium.

2. The printer according to claim 1, wherein: the menu screens further include an upper layer specific-purpose menu screen with respect to the menu screen for the medium, the upper layer specific-purpose menu screen and the menu screen for the medium being layered with respect to each other; the printer further includes an operating portion manipulated for switching the menu screens displayed on the display; in accordance with manipulation of the operating portion, the display controller operates the display to display the menu screen for the medium after displaying the upper layer specific-purpose menu screen; and when the particular operation is detected by the detecting device, the display controller operates the display to display the menu screen for the medium without displaying the upper layer specific-purpose menu screen.

3. The printer according to claim 1, wherein the specific-purpose menu screen includes a basic menu screen displayed on the display with relatively large characters, as compared to the standard menu screen.

4. The printer according to claim 1, wherein, when switching between the standard menu screen and the specific-purpose menu screen, the display controller operates the display to display an announcement that the menu screens are to be switched, continuously for a predetermined time.

5. A method used for a printer printing in correspondence with setting of various printing conditions, wherein the printer is adapted to subject a disk medium to printing and has a cover or a guide, the cover being adapted to selectively open or close an insert opening into which the disk medium is inserted, the guide being set in the printer for guiding insertion of the disk medium into the printer, the method comprising:
    preparing a plurality of menu screens selectively displayed on a display of the printer, the menu screens including a standard menu screen and a specific-purpose menu screen, the standard menu screen including a plurality of menus selectable for setting the printing conditions, the specific-purpose menu screen including some of the menus of the standard menu screen such that some of the printing conditions set via the standard menu screen can also be set via the specific-purpose menu screen, and the specific-purpose menu screen including a menu screen for the disk medium including the menus of the standard menu screen related to printing conditions of the disk medium;
    detecting a particular operation performed with respect to the printer necessarily for subjecting the disk medium to printing, wherein detecting the particular operation includes detecting an open state of the cover or setting of the guide in the printer such that the guide can guide the disk medium; and
    operating the display to display the menu screen for the disk medium based on detection of the particular operation.

* * * * *